US008892256B2

(12) United States Patent
Friedman et al.

(10) Patent No.: US 8,892,256 B2
(45) Date of Patent: *Nov. 18, 2014

(54) METHODS FOR REAL-TIME AND NEAR REAL-TIME INTERACTIONS WITH ROBOTS THAT SERVICE A FACILITY (75) Inventors: Scott Justin-Marl Friedman, Pittsburgh, PA (US); Hans Peter Moravec, Pittsburgh, PA (US); Mitchell Weiss, Carlisle, MA (US)

(73) Assignee: Seegrid Corporation, Pittsburgh, PA (US)

( * ) Notice: Subject to any disclaimer, the term of this patent is extended or adjusted under 35 U.S.C. 154(b) by 488 days.

This patent is subject to a terminal disclaimer.

(21) Appl. No.: 12/361,300

(22) Filed: Jan. 28, 2009

(65) Prior Publication Data

US 2009/0198380 A1    Aug. 6, 2009

Related U.S. Application Data (60) Provisional application No. 61/024,019, filed on Jan. 28, 2008.

(51) Int. Cl.
| G05B 19/04 | (2006.01) |
| A47L 9/00 | (2006.01) |
| A47L 9/28 | (2006.01) |
| G05D 1/02 | (2006.01) |
| B25J 13/08 | (2006.01) |
| B25J 5/00 | (2006.01) |

(52) U.S. Cl.
CPC .. B25J 5/00 (2013.01); A47L 9/009 (2013.01); A47L 9/2805 (2013.01); G05D 1/0219 (2013.01); B25J 13/086 (2013.01); A47L 9/2836 (2013.01); A47L 2201/04 (2013.01); A47L 9/2852 (2013.01); A47L 9/2894 (2013.01)

USPC ........... 700/255; 700/245; 700/250; 700/258; 700/259

(58) Field of Classification Search
CPC ............. A47L 2201/06; G05D 1/0219; G05D 2201/0215; G06Q 10/06316
USPC ......... 700/345, 250, 253, 255, 257, 258, 259; 701/23, 25–28; 901/1; 318/568.12
See application file for complete search history.

(56) References Cited

U.S. PATENT DOCUMENTS

| 4,674,048 A | 6/1987 | Okumura |
| 5,032,775 A | 7/1991 | Mizuno et al. |

(Continued)

FOREIGN PATENT DOCUMENTS

| JP | 63-222726 | 9/1988 |
| JP | 5-143158 | 6/1993 |

(Continued)

OTHER PUBLICATIONS

Bennewitz et al., Adapting Navigation Strategies Using Motions Patterns of People, 2003, Proceedings of the 2003 IEEE International Conference on Robotics & Automation, pp. 2000-2005.*

(Continued)

*Primary Examiner* — James Trammell
*Assistant Examiner* — Jerrah Edwards
(74) *Attorney, Agent, or Firm* — Onello & Mello, LLP (57) ABSTRACT In accordance with aspects of the present invention, a service robot and methods for controlling such a robot are provided. In particular, the robot is configured to sense the presence of a person and to take a next action in response to sensing the presence of the person. As examples, the robot could leave the area, await commands from the person, or enter an idle or sleep state or mode until the person leaves.

37 Claims, 4 Drawing Sheets

(56) References Cited

U.S. PATENT DOCUMENTS

| | | | |
|---|---|---|---|
| 5,086,535 A * | 2/1992 | Grossmeyer et al. | 15/319 |
| 5,369,347 A | 11/1994 | Yoo | |
| 5,440,216 A | 8/1995 | Kim | |
| D364,840 S | 12/1995 | Oshizawa et al. | |
| 5,534,762 A | 7/1996 | Kim | |
| 5,682,313 A | 10/1997 | Edlund et al. | |
| 5,684,695 A | 11/1997 | Bauer | |
| D395,285 S | 6/1998 | Allon | |
| 5,867,800 A | 2/1999 | Leif | |
| 6,076,025 A | 6/2000 | Ueno et al. | |
| 6,076,223 A | 6/2000 | Dair et al. | |
| 6,076,230 A | 6/2000 | Harsh | |
| 6,119,057 A | 9/2000 | Kawagoe | |
| 6,124,694 A | 9/2000 | Bancroft et al. | |
| 6,278,904 B1 * | 8/2001 | Ishii | 700/245 |
| 6,339,735 B1 | 1/2002 | Peless et al. | |
| 6,374,155 B1 | 4/2002 | Wallach et al. | |
| 6,389,329 B1 | 5/2002 | Colens | |
| 6,459,955 B1 | 10/2002 | Bartsch et al. | |
| 6,496,754 B2 | 12/2002 | Song et al. | |
| 6,496,755 B2 * | 12/2002 | Wallach et al. | 700/245 |
| 6,532,404 B2 | 3/2003 | Colens | |
| 6,539,284 B2 * | 3/2003 | Nourbakhsh et al. | 700/245 |
| 6,604,022 B2 * | 8/2003 | Parker et al. | 700/258 |
| 6,611,120 B2 | 8/2003 | Song et al. | |
| 6,667,592 B2 | 12/2003 | Jacobs et al. | |
| 6,668,157 B1 | 12/2003 | Takeda et al. | |
| 6,728,608 B2 | 4/2004 | Ollis et al. | |
| 6,732,826 B2 | 5/2004 | Song et al. | |
| 6,760,647 B2 * | 7/2004 | Nourbakhsh et al. | 700/245 |
| 6,774,596 B1 | 8/2004 | Bisset | |
| 6,841,963 B2 | 1/2005 | Song et al. | |
| 6,868,307 B2 | 3/2005 | Song et al. | |
| 6,870,792 B2 | 3/2005 | Chiappetta | |
| 6,879,878 B2 | 4/2005 | Glenn et al. | |
| 6,883,201 B2 | 4/2005 | Jones et al. | |
| 6,925,679 B2 | 8/2005 | Wallach et al. | |
| 6,957,712 B2 | 10/2005 | Song et al. | |
| 6,968,592 B2 | 11/2005 | Takeuchi et al. | |
| 6,984,952 B2 | 1/2006 | Peless et al. | |
| 7,024,278 B2 | 4/2006 | Chiappetta et al. | |
| 7,155,308 B2 | 12/2006 | Jones | |
| 7,162,056 B2 | 1/2007 | Burl et al. | |
| 7,167,775 B2 | 1/2007 | Abramson et al. | |
| 7,188,000 B2 | 3/2007 | Chiappetta et al. | |
| 7,206,677 B2 | 4/2007 | Hulden | |
| D541,798 S | 5/2007 | Ichida et | |
| 7,251,548 B2 * | 7/2007 | Herz et al. | 701/23 |
| 7,446,766 B2 | 11/2008 | Moravec | |
| 7,447,593 B2 * | 11/2008 | Estkowski et al. | 701/301 |
| 7,507,948 B2 | 3/2009 | Park et al. | |
| 7,526,362 B2 * | 4/2009 | Kim et al. | 700/245 |
| D602,931 S | 10/2009 | Kaner et al. | |
| D613,341 S | 4/2010 | Mar et al. | |
| 7,720,572 B2 | 5/2010 | Ziegler et al. | |
| 7,805,220 B2 | 9/2010 | Taylor et al. | |
| 7,835,821 B2 | 11/2010 | Roh et al. | |
| D697,198 S | 1/2014 | Amirouche et al. | |
| 2001/0047231 A1 | 11/2001 | Peless et al. | |
| 2002/0016649 A1 | 2/2002 | Jones | |
| 2002/0095239 A1 | 7/2002 | Wallach et al. | |
| 2002/0120364 A1 | 8/2002 | Colens | |
| 2002/0138936 A1 | 10/2002 | Takeuchi et al. | |
| 2002/0153184 A1 | 10/2002 | Song et al. | |
| 2003/0025472 A1 | 2/2003 | Jones et al. | |
| 2003/0028286 A1 | 2/2003 | Glenn et al. | |
| 2003/0212472 A1 | 11/2003 | McKee | |
| 2004/0030571 A1 | 2/2004 | Solomon | |
| 2004/0073337 A1 | 4/2004 | McKee et al. | |
| 2004/0076324 A1 | 4/2004 | Burl et al. | |
| 2004/0083570 A1 | 5/2004 | Song et al. | |
| 2004/0167716 A1 | 8/2004 | Goncalves et al. | |
| 2004/0168148 A1 | 8/2004 | Goncalves et al. | |
| 2004/0204792 A1 | 10/2004 | Taylor et al. | |
| 2004/0207355 A1 | 10/2004 | Jones et al. | |
| 2005/0000543 A1 | 1/2005 | Taylor et al. | |
| 2005/0067994 A1 | 3/2005 | Jones et al. | |
| 2005/0080514 A1 | 4/2005 | Omote et al. | |
| 2005/0134209 A1 | 6/2005 | Kim | |
| 2005/0216126 A1 | 9/2005 | Koselka et al. | |
| 2005/0273226 A1 | 12/2005 | Tani | |
| 2005/0273967 A1 | 12/2005 | Taylor et al. | |
| 2005/0287038 A1 | 12/2005 | Dubrovsky et al. | |
| 2005/0288079 A1 | 12/2005 | Tani | |
| 2006/0020369 A1 | 1/2006 | Taylor et al. | |
| 2006/0038521 A1 | 2/2006 | Jones et al. | |
| 2006/0060216 A1 | 3/2006 | Woo | |
| 2006/0061476 A1 | 3/2006 | Patil et al. | |
| 2006/0095158 A1 | 5/2006 | Lee et al. | |
| 2006/0178777 A1 | 8/2006 | Park et al. | |
| 2006/0293788 A1 * | 12/2006 | Pogodin | 700/245 |
| 2007/0042716 A1 | 2/2007 | Goodall et al. | |
| 2007/0135962 A1 | 6/2007 | Kawabe et al. | |
| 2007/0192910 A1 | 8/2007 | Vu et al. | |
| 2007/0199108 A1 | 8/2007 | Angle et al. | |
| 2007/0244610 A1 | 10/2007 | Ozick et al. | |
| 2007/0267570 A1 | 11/2007 | Park et al. | |
| 2008/0004904 A1 | 1/2008 | Tran | |
| 2008/0056933 A1 * | 3/2008 | Moore et al. | 422/1 |
| 2008/0086236 A1 | 4/2008 | Saito et al. | |
| 2008/0109114 A1 | 5/2008 | Orita et al. | |
| 2008/0184518 A1 | 8/2008 | Taylor et al. | |

FOREIGN PATENT DOCUMENTS

| | | |
|---|---|---|
| JP | 6-314124 | 11/1994 |
| JP | 07101500 | 4/1995 |
| JP | 9-90026 | 4/1997 |
| JP | 11-104984 | 4/1999 |
| JP | 11-104984 A | 4/1999 |
| JP | 2000-339028 | 12/2000 |
| JP | 2000-342498 | 12/2000 |
| JP | 2001-67124 | 3/2001 |
| JP | 2001-246580 | 9/2001 |
| JP | 2001-300874 | 10/2001 |
| JP | 2002-85305 | 3/2002 |
| JP | 2002-254374 A | 9/2002 |
| JP | 2002-325708 | 11/2002 |
| JP | 2002-351305 | 12/2002 |
| JP | 2003006532 | 1/2003 |
| JP | 2003-515210 A | 4/2003 |
| JP | 2003-515801 | 5/2003 |
| JP | 2003-180587 | 7/2003 |
| JP | 2003-225184 | 8/2003 |
| JP | 2003241833 | 8/2003 |
| JP | 2003-256043 | 9/2003 |
| JP | 2004-33340 | 2/2004 |
| JP | 2004-97439 | 4/2004 |
| JP | 2004-097439 A | 4/2004 |
| JP | 2004-148090 | 5/2004 |
| JP | 2004148089 | 5/2004 |
| JP | 2005-111603 A | 4/2005 |
| JP | 2005-124753 | 5/2005 |
| JP | 2005-205028 | 8/2005 |
| JP | 2005-219161 | 8/2005 |
| JP | 2006-007368 A | 1/2006 |
| JP | 2006-087918 A | 4/2006 |
| JP | 2006-102861 A | 4/2006 |
| JP | 2006-218005 | 8/2006 |
| JP | 2006-252273 | 9/2006 |
| JP | 2006-331054 | 12/2006 |
| JP | 2007-4527 | 1/2007 |
| JP | 2007-309921 | 11/2007 |
| JP | 2008-3979 | 1/2008 |
| KR | 10-2002-0076153 A | 10/2002 |
| KR | 10-2002-0081035 A | 10/2002 |
| KR | 10-2002-0088880 A | 11/2002 |
| KR | 10-0645818 B1 | 11/2006 |
| WO | 01/37060 | 5/2001 |
| WO | 0137060 A | 5/2001 |

(56) References Cited

FOREIGN PATENT DOCUMENTS

| WO | 0138945 | 5/2001 |
| WO | 2007/051972 | 5/2007 |

OTHER PUBLICATIONS

Alami et al., Diligent: Towards a Human-Friendly Navigation System, 2000, Proceedings of the 2000 IEEE/RSJ International Conference on Intelligent Robots and Systems, pp. 21-26.*

Lee et al., An Agent for Intelligent Spaces: Functions and Roles of Mobile Robots in Sensored, Networked and Thinking Spaces, 1997, IEEE Conference on Intelligent Transportation System (ITSC '97), pp. 983-988.*

Extended European Search Report dated Feb. 22, 2011 issued in corresponding European Application No. EP09706350.

Extended European Search Report dated Mar. 7, 2011 issued in corresponding European Application No. EP09705670.

Extended European Search Report dated Mar. 8, 2011 issued in corresponding European Application No. EP09706723.

International Search Report dated Aug. 31, 2009 issued in corresponding International Application No. PCT/US2009/032274.

International Search Report dated Sep. 14, 2009 issued in corresponding International Application No. PCT/US2009/032243.

International Search Report dated Sep. 14, 2009 issued in corresponding International Application No. PCT/US2009/032245.

International Search Report dated Sep. 30, 2009 issued in corresponding International Application No. PCT/US2009/034081.

Extended European Search Report dated Sep. 12, 2013 issued in corresponding European Application No. 09710577.9.

Office Action dated Jan. 22, 2013 issued in corresponding Japanese Application No. 2010-545106.

Office Action dated Apr. 2, 2013 issued in related Japanese Application No. 2010-546923.

Office Action dated Feb. 19, 2013 issued in related Japanese Application No. 2010-545107.

Office Action in U.S. Appl. No. 29/471,328, dated Jun. 4, 2014.

Office Action in Chinese Patent Application No. 200980108309.X, dated Jun. 4, 2014.

Flexible & integrated unmanned command & control [online]. Howard, Courtney, 2013 [retrieved on May 24, 2014]. Retrieved from the Internet: <URL: http://www.militaryaerospace.com/articles/print/volume-24/issue-11/special-report/ flexible-integrated-unmanned-command-control.html>.

* cited by examiner

METHODS FOR REAL-TIME AND NEAR REAL-TIME INTERACTIONS WITH ROBOTS THAT SERVICE A FACILITY

CROSS-REFERENCE TO RELATED APPLICATION

This application claims the benefit of priority under 35 U.S.C. §119(e) from provisional application Ser. No. 61/024,019 filed on Jan. 28, 2008 which is incorporated herein by reference in its entirety.

FIELD OF INTEREST

The present inventive concepts relate to methods for optimal interactions between people and service robots, including robotic cleaners, while they are servicing a facility.

BACKGROUND

One of the advantages of service robots is that they can do the dull and dirty jobs in human facilities, such as homes, commercial and industrial buildings, and institutions. However, that very action of robotic service itself may be unpleasant, inconvenient, disruptive, or even dangerous to a human that comes into proximity of the working robot.

Previous service robots have ignored this problem. As an example, current robot cleaners blithely treat humans the same way they treat the leg of a stool; usually by bumping into it, going around, it and continuing their work.

Although some robots built for human interaction have included the ability to recognize humans in their proximity, to date this has been used to further the interaction itself, but not to further a distinct service agenda.

SUMMARY OF INVENTION

The present invention has been conceived to solve the above-mentioned problems occurring in the prior art. In accordance with aspects of the present invention, provided is a system and method that allows a robot to service a facility while more effectively interacting with people.

In order to achieve the above aspects, there is provided various methods of enabling the robot to optimally respond in the presence of a person.

The robot can be configured to have a work pause, whereby when the robot senses the proximity of a person it stops working and remains still and silent.

The robot can be configured to move out of the way, whereby when the robot senses the proximity of a person it stops working and actively moves into a position of the room that is least disturbing the person. This may be away from the person or nearer the person, depending on other factors.

The robot can be configured to move out of the room, whereby when the robot sense the proximity of a person it moves to another area of the facility where it is no longer in proximity to people.

The robot can be configured to look to a person to point things out when the person enters the room. This can provide a seamless way to improve the decision making process of the robot.

The robot can be configured to keep track of a work stoppage, so that it can restart work in the area once the person has left.

BRIEF DESCRIPTION OF THE DRAWINGS

The present invention will become more apparent in view of the attached drawings and accompanying detailed description. The embodiments depicted therein are provided by way of example, not by way of limitation, wherein like reference numerals refer to the same or similar elements. The drawings are not necessarily to scale, emphasis instead being placed upon illustrating aspects of the invention. In the drawings.

DETAILED DESCRIPTION OF PREFERRED EMBODIMENT

Hereinafter, aspects of the present invention will be described by explaining illustrative embodiments in accordance therewith, with reference to the attached drawings. While describing these embodiments, detailed descriptions of well-known items, functions, or configurations are typically omitted for conciseness.

It will be understood that, although the terms first, second, etc. are be used herein to describe various elements, these elements should not be limited by these terms. These terms are used to distinguish one element from another, but not to imply a required sequence of elements. For example, a first element can be termed a second element, and, similarly, a second element can be termed a first element, without departing from the scope of the present invention. As used herein, the term "and/or" includes any and all combinations of one or more of the associated listed items.

It will be understood that when an element is referred to as being "on" or "connected" or "coupled" to another element, it can be directly on or connected or coupled to the other element or intervening elements can be present. In contrast, when an element is referred to as being "directly on" or "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, steps, operations, elements, and/or components, but do not preclude the presence or addition of one or more other features, steps, operations, elements, components, and/or groups thereof.

Spatially relative terms, such as "beneath," "below," "lower," "above," "upper" and the like may be used to describe an element and/or feature's relationship to another element(s) and/or feature(s) as, for example, illustrated in the figures. It will be understood that the spatially relative terms are intended to encompass different orientations of the device in use and/or operation in addition to the orientation depicted in the figures. For example, if the device in the figures is turned over, elements described as "below" and/or "beneath" other elements or features would then be oriented "above" the other elements or features. The device may be otherwise oriented (e.g., rotated 90 degrees or at other orientations) and the spatially relative descriptors used herein interpreted accordingly.

In accordance with aspects of the present invention, a robotic cleaner (or other type of service platform) can be configured to implement a method of more effectively interacting with people while servicing a space. The platform and method can determine that the platform is in the presence of people and implement a different servicing pattern or behavior as a function thereof. The determination that the robotic platform is in the presence of people can be accomplished using any one or more of a plurality of types of sensors mounted on, integral with, or coupled to the robotic platform or mounted elsewhere in the environment and in communication, directly or indirectly with the robotic platform.

Figure 1:
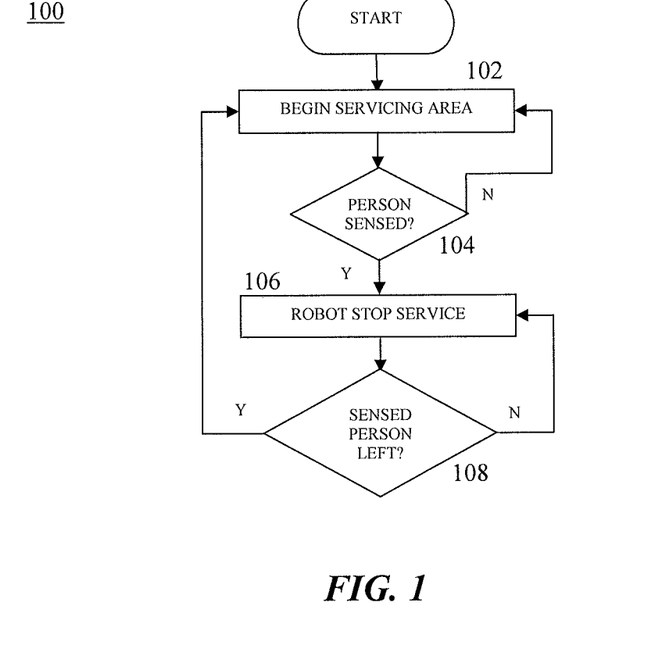
FIGS. 1, 2, 3, 4, and 5 are flowcharts illustrating embodiments of control operation procedures of a robot configured to service a facility and to interact with humans during such service.

FIG. 1 is a flowchart 100 of an embodiment of a method for controlling a service robot when a person enters an area or room. In this embodiment the service robot is a cleaning robot, such as a robotic vacuum. This is a work pause method, whereby when the robot senses the proximity of a person it stops working and remains still and silent.

In step 102 the robot is in the process of servicing (e.g., cleaning) a room (or area). In step 104 the robot senses whether or not a person has entered the room. A variety of different types of sensors could be used, such as, for example, motion detection sensors, video camera sensors, acoustic sensors and so on.

If in step 104 a person was not sensed, the process continues in step 102, where the robot continues to clean, in this example. Thus, the sensing can serve as an interrupt condition to the servicing condition of the robot. If in step 104 the answer was "yes" then the process continues to step 106 where the robot stops and sits still. The robot can then can then transition to a quiet, sleep, or inactive mode where it makes little or no noise and uses minimum power, e.g., at least enough to power the sensors.

In step 108 the robot senses whether the person left the room or area. If not, the process remains (or returns to) step 106 where the robot remains idle. If the person did leave the room or area, then the process continues to step 102 where the robot resumes cleaning—i.e., wakes up.

Figure 2:
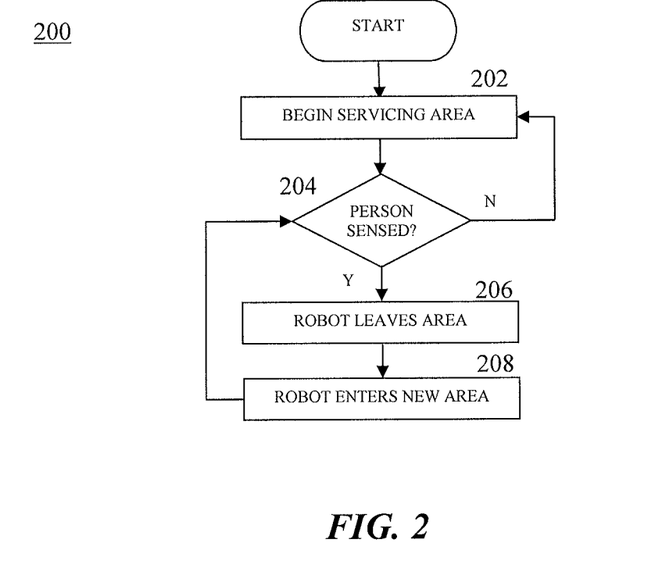

FIG. 2 is a flowchart 200 of another embodiment of a method for controlling a service robot when a person enters an area or a room. In this method when the robot senses the proximity of a person it moves to another area of the facility where it is no longer in proximity to people.

In step 202 the robot is cleaning in an area. In step 204 a determination is made of whether a person has entered the area. This is preferably an on-going sensing activity, rather than a discrete standalone step. If a person was not sensed, the process continues in step 202, where it is cleaning. However, if in step 204 it was determined that a person entered the room or area, the process continues to step 206. In this step the robot leaves the area it was cleaning. In step 208 the robot enters a new area and can begin cleaning that area, if needed. Preferably the new area is one without people.

Figure 3:
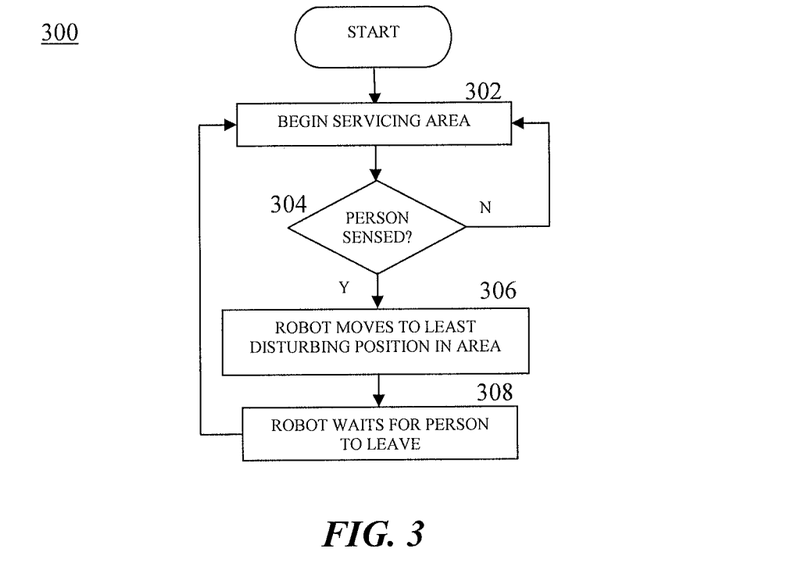

FIG. 3 is a flowchart 300 of another embodiment of a method for controlling a service robot when a person enters an area or a room. In this method when the robot senses the proximity of a person it stops working and actively moves into a position of the room or area that is least disturbing the person. This may be away from the person or nearer the person, depending on other factors.

In step 302 the robot is cleaning in an area. In step 304 a determination is made of whether a person has entered the area. This is preferably an on-going sensing activity, rather than a discrete standalone step. If a person was not sensed, the process continues in step 302, where it is cleaning. However, if in step 304 it was determined that a person entered the room or area, the process continues to step 306. In this step the robot stops cleaning and moves to another location within the area it was cleaning, e.g. a least disturbing area. A set of rules can be defined for choosing the least disturbing area, such as either within or outside a certain distance from the user, proximate to the entrance of the area through which the user entered, and so on. In step 308 the robot senses when the person leaves and then returns to step 302 and its cleaning operation.

Figure 4:
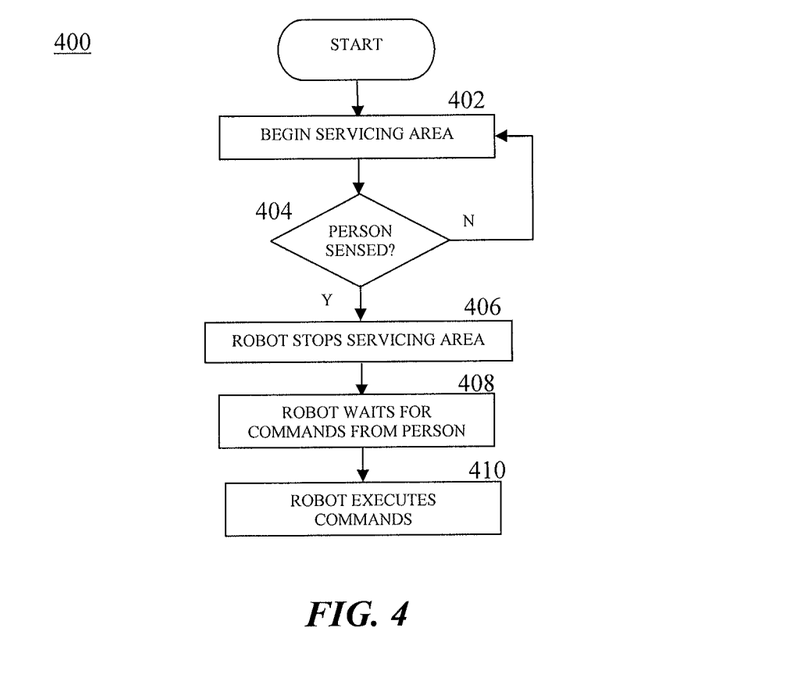

FIG. 4 is a flowchart 400 of another embodiment of a method for controlling a service robot when a person enters an area or a room. When a person enters an area or room the service robot transitions to a mode where it looks to the person to provide commands, e.g., by pointing things out, giving verbal instructions, etc. This results in an improved and seamless way to improve the decisions making process of the robot.

In step 402 the robot is cleaning in an area. In step 404 a determination is made of whether a person has entered the area. This is preferably an on-going sensing activity, rather than a discrete standalone step. If a person was not sensed, the process continues in step 402, where the robot is cleaning. However, if in step 404 it was determined that a person entered the room or area, the process continues to step 406, where the robot stops cleaning. In step 408 the robot awaits commands from the person for its next action, e.g., continue cleaning, leave area, enter sleep mode, etc. In step 410 the robot executes the commands.

Figure 5:
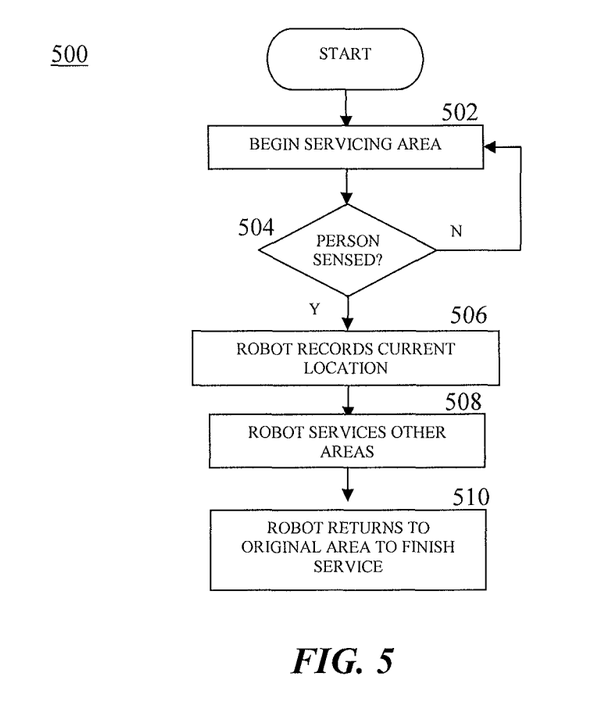

FIG. 5 is a flowchart 500 of another embodiment of a method for controlling a service robot when a person enters an area or a room. When a person enters and area or room the service robot leaves the area to clean another area and returns later to the left area to finish servicing that area.

In step 502 the robot is cleaning in an area. In step 504 a determination is made of whether a person has entered the area. This is preferably an on-going sensing activity, rather than a discrete standalone step. If a person was not sensed, the process continues in step 502, where the robot is cleaning. However, if in step 504 it was determined that a person entered the room or area, the process continues to step 506, where the robot records its current location. The robot could record its location in an on-going basis so that it maintains a record of all areas cleaned, whether fully or partially. In step 508 the robot moves to another area to service (e.g., clean) that area. In step 510 the robot returns to the original area to finish cleaning.

In the various service robot methods, therefore, the robot can be configured to keep track of the work stoppage, so that it can restart work in that area once the person has left.

As will be appreciated by those skilled in the art, a service robot (e.g., vacuum) includes a memory for storing instructions and data, and a processor for executing the instructions. Thus, the methods discussed above can be programmed into the service robotic for execution to accomplish the functions disclosed herein.

In another implementation of the method, the sensing of the person in the area of the robot may be performed by sensors installed in the environment and communicating directly or indirectly with the service robot. In this embodiment, the sensors may be serving other functions, such as temperature control, or security sensing of the environment, and communicating with other control components of the environment. The implementation requires the spatial relationships between the robot and the sensors is known. There are many possible implementations of this including perception of the sensors by the robot, a-priori knowledge of the sensors locations in a "map", or information provided by an environment-wide control system.

Portions of the above description refer to the robot being configured to execute different behaviors in response to the presence of people. This configuration can be implemented as a "pre-programmed" behavior, or as a "set-up" menu providing a series of optional behaviors to be executed under certain triggering conditions as is commonly available on consumer and industrial products.

Also, while the service robot was indicated as a robotic cleaner in this embodiment, those skilled in the art will appreciate that methods in accordance with the present invention could be applied to any number of service robots, and could implement any number and types of sensors.

Figure 6:
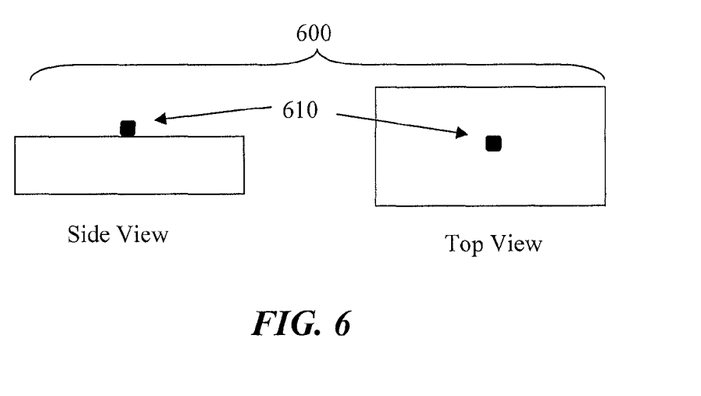
FIG. 6 shows an embodiment of a service robot including an upward facing sensor.

FIG. 6 shows an embodiment of a service robot 600 including an upward facing sensor 610. The sensor 610 can be used to determine whether a person has entered the area. The determination may be based on other perceptual techniques such as acoustics, motion detection, etc. In still other embodiments, the determination method may be based on a combination thereof.

Figure 7:
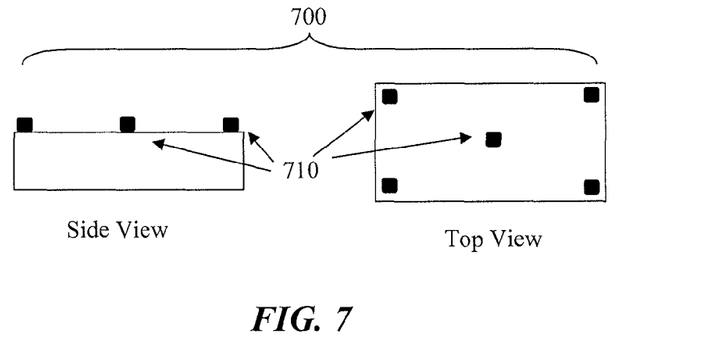
FIG. 7 shows an embodiment of a service robot including multiple sensors.

FIG. 7 shows an embodiment of a service robot 700 with multiple sensors 710 that allow the robot 700 to determine the presence of a person in the area.

Figure 8:
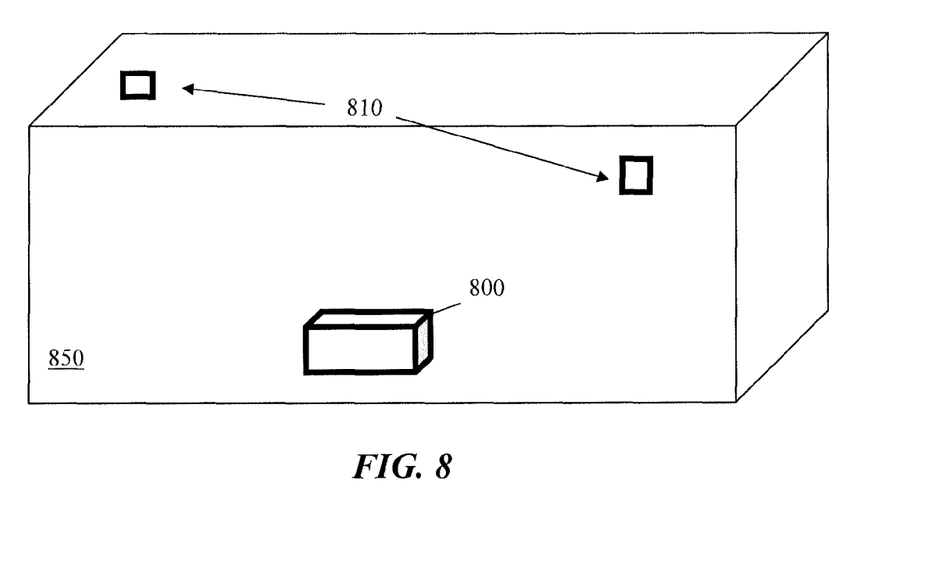
FIG. 8 shows an embodiment of a service robot interactively communicating with multiple sensors installed in an environment.

FIG. 8 shows an embodiment of a service robot 800 interactively communicating with multiple sensors 810 installed in the environment 850 allowing the robot 800 to determine the presence of a person (not shown) in the environment 850.

While the foregoing has described what are considered to be the best mode and/or other preferred embodiments, it is understood that various modifications can be made therein and that the invention or inventions may be implemented in various forms and embodiments, and that they may be applied in numerous applications, only some of which have been described herein.

What is claimed is:

1. A method of servicing a facility with a robot that detects a living being, the method comprising:
navigating the robot to a first area within an environment using automatic self-control by the robot;
automatically commencing a first service of a first room by the robot;
sensing a living being in the first room by the robot while providing the first service; and
performing at least one form of service pause of the first service in response to sensor data received from the sensing, the at least one form of service pause including the robot self-navigating to a second area, outside of the first room, to perform a second service of the second area and then returning to the first room to restart the first service of the first room.

2. The method of claim 1, wherein the at least one form of service pause further includes stopping performance of the first service when the robot senses a proximity of a person.

3. The method of claim 2, wherein the stopping of the performance of the first service further includes sensing a proximity of the person, determining a location that is least disturbing to the person, and actively moving to the location.

4. The method of claim 3, wherein the location is away from the person.

5. The method of claim 3, wherein the location is nearer the person.

6. The method of claim 3, wherein the person is in the first room and the location is out of the first room.

7. The method of claim 2, further comprising the robot recording in memory the service pause, including recording the robot's current location.

8. The method of claim 7, further comprising restarting the first service in the first room once the sensor data indicates the person has left the first room.

9. The method of claim 1, further comprising the robot responding to a gesture or verbal command from a person in a room in which the robot is present.

10. The method of claim 1, wherein the sensing further includes using one or more of light sensing, acoustic sensing, visual sensing, motion detection, heat sensing, and electromagnetic sensing.

11. The method of claim 1, wherein the sensing is performed by one or more sensors attached to the robot.

12. The method of claim 1, wherein the sensing is performed by one or more sensors in the environment.

13. The method of claim 1, wherein the robot is a robotic vacuum cleaner.

14. A service robot configured to detect the presence of a living being, the service robot comprising:
a platform supporting a servicing subsystem;
the servicing subsystem coupled to a drive mechanism and configured to navigate the platform to a first room within an environment and to commence a first service of the first room; and
one or more sensors configured to sense a person in the first room during the first service;
wherein the servicing subsystem controls the service robot to perform at least one form of service pause in response to sensor data received from the one or more sensors, the at least one form of service pause including the service robot self-navigating to a second area, outside of the first room, to perform a second service of the second area and then returning to the first room to restart the first service of the first room.

15. The system of claim 14, wherein the servicing subsystem is further configured to cause a stoppage in the first service, as a form of service pause, when the service robot senses a proximity of a person.

16. The system of claim 15, wherein the servicing subsystem is further configured, as part of the stoppage in the first service, to determine a location that is least disturbing to the person, and automatically move the service robot to the location.

17. The system of claim 16, wherein the location is away from the person.

18. The system of claim 16, wherein the location is nearer the person.

19. The system of claim 15, wherein the person is in the first room and the location is out of the first room.

20. The system of claim 14, wherein the service robot is configured to record in a memory the service pause, including recordation of the service robot's current location.

21. The system of claim 20, wherein the servicing subsystem is further configured to restart the first service in the first room once the sensor data indicates the person has left the first room.

22. The system of claim 14, wherein the service robot is configured to respond to a gesture or verbal command from a person in a room in which the service robot is present.

23. The system of claim 14, wherein the one or more sensors includes light sensors, and/or acoustic sensors, and/or visual sensing, and/or motion detection, and/or heat sensing, and/or electromagnetic sensors.

24. The system of claim 14, wherein the service robot is a robotic vacuum cleaner.

25. The system of claim 14, wherein one or more of the sensors are attached to the service robot.

26. The system of claim 14, wherein one or more of the sensors are attached to the environment.

27. A service robot configured to detect the presence of a living being, the service robot comprising:
a platform supporting a servicing subsystem;
the servicing subsystem coupled to a drive mechanism and configured to navigate the platform to a first room within an environment; and
a communication system configured to communicate with one or more sensors installed in the environment that are configured to sense a person in the first room during performance of a first service of the first room;
wherein the servicing subsystem controls the service robot to perform at least one form of service pause in response to sensor data received from the one or more sensors, the at least one form of service pause including the service robot self-navigating to a second area, outside of the first room, to perform a second service of the second area and then returning to the first room to restart the first service of the first room.

28. The system of claim 27, wherein the servicing subsystem is further configured to cause a stoppage in the first service, as a form of service pause, when the service robot senses a proximity of a person.

29. The system of claim 27, wherein the servicing subsystem is further configured, as part of the work stoppage in the first service, to determine a location that is least disturbing to the person, and automatically move the service robot to the location.

30. The system of claim 29, wherein the location is away from the person.

31. The system of claim 29, wherein the location is nearer the person.

32. The system of claim 29, wherein the person is in the first room and the location is out of the first room.

33. The system of claim 28, wherein the service robot is configured to record in a memory the service pause, including recordation of the service robot's current location.

34. The system of claim 33, wherein the servicing subsystem is further configured to restart the first service in the first room once the sensor data indicates the person has left the first room.

35. The system of claim 27, wherein the service robot is configured to respond to a gesture or verbal command from a person in a room in which the service robot is present.

36. The system of claim 27, wherein the one or more sensors includes one or more light sensors, acoustic sensors, visual sensors, motion detection sensors, heat sensors, and electromagnetic sensors.

37. The system of claim 27, wherein the service robot is a robotic vacuum cleaner.

* * * * *